Sept. 10, 1968

R. WELLS 3,401,079

PULP MOLDING

Filed July 15, 1965

INVENTOR
Roger Wells

BY Karl W. Flocks

ATTORNEY

United States Patent Office 3,401,079
Patented Sept. 10, 1968

3,401,079
PULP MOLDING
Roger Wells, Stamford, Conn., assignor to Diamond International Corporation, New York, N.Y., a corporation of Delaware
Filed July 15, 1965, Ser. No. 472,159
10 Claims. (Cl. 162—219)

ABSTRACT OF THE DISCLOSURE

The present disclosure relates to the molding of plural ply pulp articles in a simplified and inexpensive manner by providing a conventional molding drum and associating therewith a plurality of simple molding devices which are capable of only forming a deposit without draining the filtrate from behind. When a ply is molded by the simple device, it is immediately transferred to the complex conventional molding drum along with the filtrate which is then drawn back through the pulp layer in the opposite direction.

---

Figure 1:
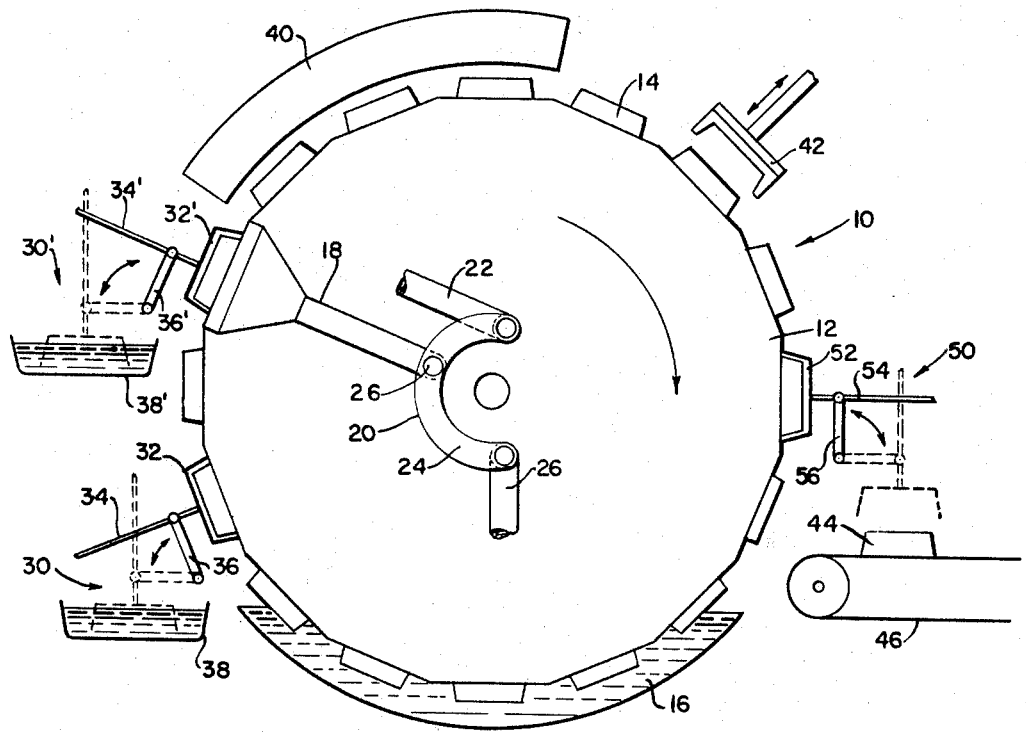

The present invention relates to a method and apparatus for pulp molding and, more particularly, to a method and apparatus for forming plural ply pulp molded articles utilizing a wet transfer operation.

The desirability of forming plural ply pulp molded articles has been known for many years. Plural ply articles formed of pulp have a number of advantages which may include, depending on the method of formation, smoother surfaces, different colored plys for decorative purposes, different types of pulp fibers serving different functions, etc. However, the primary defect in the plural ply articles of the prior art has been their high cost of production.

Perhaps the earliest method of forming plural ply pulp articles involved the separate formation of two distinct layers, their separate drying and finally a lamination utilizing adhesive and pressure. Such a procedure has a number of obvious defects such as the use of laminating equipment, the need for twice as much pulp molding equipment to make the same number of articles, etc.

Subsequently, it was discovered that two separately formed pulp layers could be laminated together while still wet. A number of patents show such a so-called wet lamination and these include the patents to Kienle et al. No. 1,921,757; Randall et al. No. 2,234,979 and Chaplin No. 2,377,864. The methods and apparatus for carrying out these wet laminations are also expensive and it is impossible to produce the products utilizing these methods and apparatus under high speed molding techniques.

It has also been known to form pulp articles by trapping a slurry between two facing dies and drawing the water from the slurry through both dies while moving the two dies towards one another. While the articles from such a process are provided with smooth surfaces on both sides, the cost of such articles is prohibitive because of the great complexity of the equipment and the very low speed at which molding can be carried out. Patents which show such procedure include the patents to Randall No. 2,628,540 and Emery No. 3,053,728.

It is therefore an object of the present invention to eliminate the defects and problems of the prior art, such as indicated above, in the formation of plural ply pulp molded articles.

It is another object of the present invention to provide a simplified apparatus which permits the high speed and inexpensive molding of plural ply pulp molded articles.

It is another object of the present invention to provide a simple, very fast and inexpensive method of forming plural ply pulp molded articles.

It is another object of the present invention to provide for the wet transfer of a pulp molded layer to another die which already has a layer thereon, and the laminating of the two layers together by drawing a large quantity of liquid through the two layers in one direction.

It is another object of the present invention to provide an apparatus for pulp molding which is simple, inexpensive to build, and which occupies much less space than conventional molding equipment.

It is another object of the present invention to provide a molding mechanism that will operate much faster because of simplified principles than will conventional molding machinery.

It is another object of the present invention to provide a practical and simple method of making a laminated molded article which has improved properties over that made by conventional methods.

It is another object of the present invention to provide a simple molding mechanism which does not have to be inverted or rotated prior to transferring an article therefrom.

It is another object of the present invention to provide a pulp molded article which is smooth on both sides without the necessity of pressing.

It is another object of the present invention to provide an article which is more uniform than are plural ply articles formed by molding one layer directly on top of another.

Figure 2:
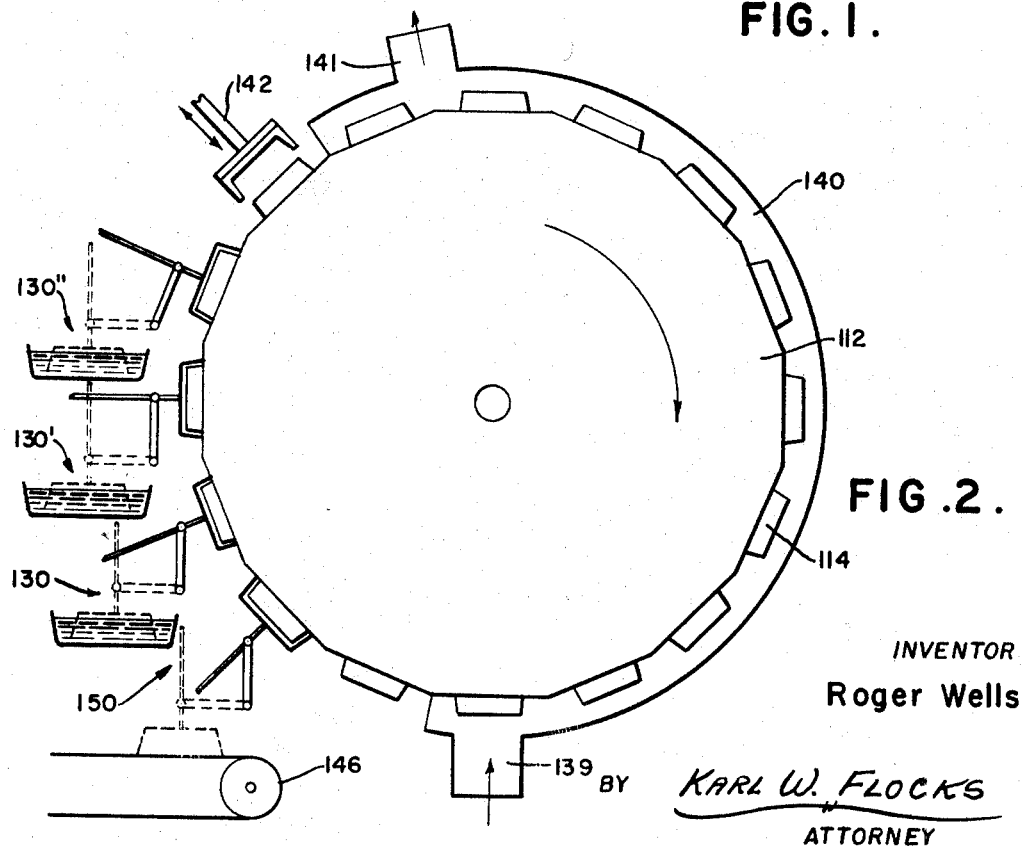

Other objects and the nature and advantages of the instant invention will become apparent from the following description taken in conjunction with the accompanying drawing of the invention wherein:

FIG. 1 is a essentially diagrammatic side elevation of an installation in accordance with the present invention; and FIG. 2 is an essentially diagrammatic side elevation of another embodiment of the present invention.

To fully understand the present invention, it is first necessary to understand the difficulties presented in the normal pulp molding process. Conventionally, a perforated suction mold or die, covered with a wire, is mounted on a chamber or mold box. The mold box is usually on the end of a spoke or mounted on the periphery of a drum having from four to sixteen faces. Vacuum is applied through the spoke of the drum so that as the drum rotates through a slurry of fibers and water, the fibers are deposited on the die and the filtrate is pulled therethrough into the mold box.

As the drum rotates in a clockwise manner, the filtrate flows downhill through the spoke of the drum when the mold passes the nine o'clock position and while the air is being sucked through the wet preform. The air and water go through a separator tank with the air being taken out of the top of the tank and the filtrate being removed from the bottom of the tank.

When the mold leaves the surface of the pulp slurry, the vacuum behind the mold is maintained for from 2 to 10 seconds. The draining time under vacuum causes the fibrous mat to densify and reach a dryness of from 20 to 35% fiber.

In the normal plural ply molding, following the formation procedure described above, the wet article is transferred onto another wet article which is under vacuum on another molding drum. The two-ply item is pressed and may then be transferred to a matching mold under vacuum or may be deposited onto a belt or tray for free drying in circulating hot air. The transfer from a mold is generally affected by turning the vacuum off behind the mold and applying a blast of air pressure to blow the articles therefrom.

Under all of the above conditions, efforts are made to keep the article as uniformly dry as possible, and not permit any of the filtrate to be blown back into the article as it is being transferred. The assumed necessity of removing the filtrate from behind the mold has dictated the design of present molding equipment with the result that it has been necessary to rotate the mold from 90° to 180° to between the nine o'clock and twelve o'clock position so that the filtrate would flow through the spokes. Such rotation requires time and space and as a result most commercial molding equipment for the formation of plural ply articles consists of more than one rotating drum. Such prior art molding equipment has numerous disadvantages. Once the article is transferred off the drum, the rest of the rotation is wasted time and space in which the molds are not being used. For high rates of production many molds are required. The physical size of the molding drums makes it impractical to combine articles made on more than two drums.

The present invention, on the other hand, provides the molding of a layer which is transferred onto a suction die or onto another molded layer which is under vacuum at the time of transfer, the layer being transferred with the filtrate. In other words, a first suction die is moved in a given path, one pulp layer is deposited on a second die and then transferred with the filtrate behind the second die to the first die, which may or may not have a layer thereon; the filtrate is in part drawn through the transferred layer and in part runs down its face. If the first suction die originally has no pulp layer thereon (and it is desired to make a plural ply article), then a second layer must be formed after transfer of the first and in the same manner; if a first layer is formed initially on the first die, the filtrate from the second layer is drawn, in part, through the wet superimposed layers.

In this transfer operation wherein the filtrate is also blown from the second mold to the first, the fibers making up the preform retain their felted configuration. This configuration is maintained by the vacuum behind the article or mold onto which the layer is being transferred. As indicated above, part of the filtrate which has been blown along behind the transferred layer of fibers then passes back through the felted layer and into the vacuum system behind the first mold upon which the layer has been transferred. The remainder of the filtrate washes down the outside of the article in the same manner that excess water from a deckle shower flows off an article even while the article is under vacuum.

A great advantage of the present invention lies in the great simplicity of the secondary and tertiary molding devices. Since these devices need not eliminate the filtrate, their structure may be very simple. In addition, the transfer of the layer from these devices may be effective at any angle from horizontal to vertical.

A preferred form of the apparatus, shown in FIG. 1, comprises a conventional complex molding device 10 including a molding drum 12 having a series of peripherally disposed suction dies 14 thereon, and a pulp slurry vat 16 in complementary facing relationship thereto so that the forming dies 14 may pass sequentially through the vat 16 and each receive a layer of pulp thereon. As is also conventional, each mold 14 is supported on a hollow spoke 18 through which vacuum is drawn and the filtrate is removed.

In the apparatus of FIG. 1, a vacuum port box 20 is provided at the hub of the drum 12 and adjacent the inner end of the spokes 18. The vacuum port box 20 is connected directly to a source of vacuum via the pipe 22. The port box 20 essentially comprises a circular plate with a semi-circular opening 24 provided therein. As the spokes 18 rotate, each in turn contacts solid plate until it reaches the area of the port box provided with opening 24. At that point vacuum connection is initiated between the hollow spokes 18 and the opening 24 of the port 20 through axially directed openings 26 provided at the inner end of each spoke 18. As the spokes reach the nine o'clock position water runs downwardly through the spoke from behind the mold 14 through the axial opening 26, into the semicircular opening 40 to the bottom thereof and then through an exit pipe 26.

In accordance with the present invention, a simple molding device 30 is provided at the exit end of the vat 16. The simple molding device 30 includes a single pulp molding suction die 32 and a hollow pipe 34 through which vacuum is drawn. A suitable mechanism, shown in part by the linkage 36 and known in the art, is provided to rapidly orient and reorient the deposition die 32 first into a suitable pulp slurry within a slurry vat 38 and then in facing or mating relationship with each of the molds 14 as they leave the vat 16.

While the conventional molding vacuum of about 7½ lbs. per square inch is applied in the complex molding device 10, a low pressure of only 0.5 to 1.5 lbs. per square inch is needed for the simple mold 32, although a greater vacuum may be used on the mold 32 if desired. The simple molding device 30 is capable of operating at extremely high speeds. At the speed of 60 steps per minute, the simple molding device 30 can dip the die 32 into the vat 38, retain it there for one-fourth of a second, remove it from the vat 38, orient it in mating position with a die 14 as shown in solid lines, transfer the layer formed during the one-fourth of a second dwell time in the vat 38, and reorient the simple mold 32 back into the vat 38 as shown in phantom in FIG. 1, all in one second. It will be clear, of course, that when utilizing a simple wet transfer molding device 30, that it is preferable to utilize an intermittently operating complex molding device 10.

The transfer of the second pulp layer from the mold 32 onto the outer surface of the first pulp layer on the mold 14 may be accomplished merely by the differential in vacuum being applied through the two molds. Thus, if less than 1.5 lbs. per square inch of vacuum is applied to the mold 32, the normal vacuum applied through the mold 14 will be sufficient to pull the second layer from the mold 32 and onto the outer surface of the first layer, the filtrate behind the mold 32 flowing back through the mold 32 and onto the outer surface of the second and freshly transferred layer.

If, however, a higher molding vacuum is used in the mold 32, it may be necessary to either shut off the vacuum during the period in which the mold 32 mates with the mold 14, or, alternatively, utilize positive air pressure which may be blown through the pipe 34 to force the second layer and filtrate from the mold 32 and onto the outer surface of the first layer on the mold 14.

Not only is a great deal of equipment saved by eliminating structure necessary to draw the filtrate from behind mold 32, but the resultant product formed utilizing the present invention is highly advantageous. Thus, not only are the two outer surfaces of the final article smooth since both have been formed against die screens, but the transfer of the second layer to the first while the second layer is saturated with water and the forcing of the filtrate through the two saturated superimposed layers in one direction to the first die 14 unites the interface fibers and forms a laminated preform prior to any comprising of the fibers together between pressing dies.

After transfer of the second layer from the die 32 of the simple molding device 30 to the first suction mold 14, the drum 12 continues to rotate intermittently to a plurality of other stations. At subsequent stations more layers can be added to the pulp preform, if desired. Thus, a third layer may be deposited upon the outer surface of the second layer in the same manner that the second layer was deposited on the outer surface of the first layer. To accomplish this, a second simple molding device 30′ may be provided which is identical to the first simple molding device 30, and which includes a third forming die 32′, a complementary slurry vat 38′, a vacuum and/or air pressure conveying means 34′ and a suitable orientation linkage 36′. Operation of this simple molding device 30′ to effect transfer of the third layer from the third forming die 32' may be accomplished in the same manner as transfer of the second layer from the second forming die 32.

After a plurality of layers have been deposited on a die 14 as indicated above, the mold 14 may then pass through a drying hood 40 where the deposits are subjected to hot dry air. After passing through the drying hood 40, the dies 14 may then pass to a reciprocating pressing die 42 which is complementary in shape to the dies 14 and will mate therewith to squeeze the pulp preform therebetween.

Each die 14 will then pass to a delivery device 50, known in the art, which is in many ways similar to the simple molding device 30. The delivery device comprises a die shaped receiver 52, a vacuum transmitting means 54 and a suitable orienting mechanism shown in part by the linkage 56. In a manner well known in the art, the vacuum is applied through the tubing 54 to the receiver 52 which sucks the preform from the die 14. The device then orients to the position shown in phantom, the vacuum is turned off and the pulp preform 44 is dropped onto a conveyor 46 or is blown onto the conveyor utilizing positive air pressure.

While the simple molds 32 and 32' have been described as being complementary in shape to the suction dies 14, it has been surprisingly found that such dies may assume a shape substantially different from one complementary to the shape of the first dies 14. When a pulp layer is formed on a mold 32 and transferred therefrom while saturated with water and with the filtrate therebehind, it has been found that the pulp layer is both highly flexible and even somewhat stretchable. This may provide a great advantage in the formation of articles of complex shape. Under normal conditions known to the art, the molds must be complementary when forming plural ply articles. To make a complex article thus requires a plurality of complexly shaped molds which are expensive. In the present invention, the molds 32 and 32' may be of a simple shape while the molds 14 have the complex shape of the desired article. Upon transfer of the wet layer formed on the molds 32 and 32' to the complex molds 14, the wet pulp layers change shape to conform with the complex shape of the molds 14.

FIG. 2 shows another apparatus embodying the present invention. A drum 112 is provided having a plurality of suction dies 114 disposed about its periphery similar to the apparatus of FIG. 1. A plurality of simple molding devices 130, 130', and 130" are provided which are similar to the simple molding devices shown in FIG. 1. In the embodiment of FIG. 2, no pulp deposition from slurry is accomplished by the molds 114. Instead, the simple molding device 130 molds the first pulp layer and then transfers it to a bare mold 114. The molding device 130' then forms the second layer and transfers it to the upper surface of the first layer and the molding device 130" forms the third layer and transfers it to the outer surface of the second layer. After formation of the plural ply article the drum 112 continues rotating to a pressing device 142 which is similar to the press 42 of FIG. 1. After pressing, the plural ply preforms are then passed through a hot air dryer 140 having a hot dry air inlet 139 and an air outlet 141 for countercurrent drying. After passing through the dryer 140, the plural ply pulp preforms are removed from the molds 114 by a delivery device 150 which deposits the preforms on a conveyor 146.

The present invention provides many advantages over the prior art, such as indicated above. One of the primary advantages is the reduction in molding equipment and molding time accomplished by not removing the filtrate from behind the simple molds 32 but merely blowing it back onto the primary molds 14. At the time the wet transfer is accomplished, the layer transformed comprises about 75 to 90% water, not counting the filtrate therebehind which is largely passed through in the opposite direction after transfer. In addition, having the filtrate go through the second layer tends to save the fines and the separately molded pad is more uniform than it would be if it were formed directly on top of a first ply as is conventional.

Passing the filtrate back through the wet superimposed plys also generally obviates the necessity of utilizing showers; however, showers may be used if desired. Although pressing dies 42 and 142 are shown, it will be understood that the present invention obviates the necessity for these presses since the wet transfer effects an interlocking of the innerface fibers of the separate layers; the pressing will usually be employed merely to provide an article with a more uniform cross section.

While the invention has been described and shown as a vertical drum revolving on a horizontal axis, it will be understood by those skilled in the art that the complex molding device may utilize any means for conveying a plurality of molds in a series past the simple molding device, i.e. a drum revolving about a vertical axis or molds supported on a conveyor.

The apparatus of the present invention may be utilized, if desired, to form an article having a plurality of layers in different areas, although generally the articles formed utilizing the present invention would have a plurality of layers existing across the entire dimensions of the articles.

It will be obvious to those skilled in the art that various changes may be made without departing from the scope of the invention and therefore the invention is not limited to what is shown in the drawings and described in the specification but only as indicated in the appended claims.

What is claimed is:

1. A method of molding pulp comprising depositing a first pulp layer on a first forming die in a pulp slurry and removing said first die from said slurry, depositing a second pulp layer on a second forming die, immediately placing said dies in facing relation and transferring said second layer off of said second die along with the filtrate behind said second die and onto the upper surface of said first layer while at least said second layer is saturated with water, and drawing the water in said wet superimposed layers along with said original filtrate of said second layer through said superimposed layers in one direction to said first die to unite the interface fibers and form a laminated preform prior to any compressing of said layers together between pressing dies.

2. A method in accordance with claim 1 wherein said depositions occur substantially simultaneously and said transfer occurs while both layers are highly wet.

3. A method in accordance with claim 1 wherein said transfer is accomplished by blowing air through said second die.

4. A method in accordance with claim 1 wherein said first die has a configuration different from said second die and comprising blowing air through said second die to effect said transfer and to simultaneously flex said water saturated second layer to conform said second layer to the shape of said first die.

5. A method in accordance with claim 1 wherein said deposition of said second layer is accomplished by continuously applying between about 0.5 to 1.5 lbs. per square inch of vacuum to said second die, said deposition of said first layer is accomplished by applying about 7.5 lbs. per square inch of vacuum to said first die, and said transfer is accomplished by mating said dies wherein the greater vacuum behind said first die pulls said second layer from said second die.

6. A method in accordance with claim 1 wherein said deposition of said second layer is accomplished by applying vacuum to said second die, deposition of said first layer is accomplished by applying about 7.5 lbs. per square inch of vacuum to said first die, and said transfer is accomplished by mating said dies and shutting off the vacuum to said second die.

7. A method in accordance with claim 1 further comprising depositing a pulp layer on a third forming die, and immediately placing said third die in facing relation with said first die having said first and second layers thereon, and transferring said third layer off of said third die along with the filtrate behind said third die and onto the upper surface of said second layer while said third layer is saturated with water.

8. A method of molding pulp comprising moving a first suction die in a given path, depositing an initial pulp layer on a second suction die in a pulp slurry and moving said second die into facing relationship with said first die, transferring said initial layer off of said second die along with the filtrate behind said second die and onto said first die, depositing another pulp layer on a third suction die in a pulp slurry and moving said third die into facing relationship with said first die, transferring said other layer off of said third die along with the filtrate behind said third die and onto said initial layer on said first die, and applying vacuum through said first die to draw water from and through said layers.

9. In a pulp molding apparatus comprising a complex molding device having a series of first suction dies, a pulp slurry vat in facing relation to said dies, means to carry said dies through said slurry vat in sequence, means to apply vacuum to said dies to effect deposition of a first layer of pulp on said dies as they pass sequentially through said slurry vat, and means to dispose of the filtrate behind each die after deposition, the improvement for forming plural layered pulp articles comprising a simple molding device in combination with said complex molding device including a second die located at the exit end of said first vat, vat means for cooperation with said second die, means to orient said second die first to extend into said vat means and then to face said first dies sequentially as each exits from said slurry vat, means to apply vacuum to said second die as it extends into said vat to form a layer of pulp on said second die without removing the filtrate behind said second die, and means to blow said layer from said second die and the filtrate behind said second die from said second die onto said first layer on said first die as said second die faces each of said first dies.

10. A pulp molding apparatus comprising a series of first suction dies; means to apply vacuum to said dies; means to intermittently move said dies in sequence past a plurality of stations; and a simple molding device located at a first station including a deposition die, a slurry vat for cooperation with said deposition die, means to apply vacuum to said die to provide a deposit while in said vat without removing the filtrate from behind said deposition die, means to orient and reorient said deposition die first in said vat and then in facing relation with each of said suction dies as it stops at said first station, and means to transfer said deposit and said filtrate from said deposition die to said suction die while said deposit is saturated.

References Cited
UNITED STATES PATENTS 2,183,869   12/1939   Randall _____ 162—392 X DONALL H. SYLVESTER, *Primary Examiner.*

A. C. HODGSON, *Assistant Examiner.*